United States Patent [19]

Ledermann et al.

[11] Patent Number: 5,515,795
[45] Date of Patent: May 14, 1996

[54] DELIVERY SYSTEM FOR A FOLDABLE AGRICULTURAL IMPLEMENT

[75] Inventors: Donald L. Ledermann, Darien; John F. Stufflebeam, Romeoville; David D. Flamme, Downers Grove, all of Ill.

[73] Assignee: Case Corporation, Racine, Wis.

[21] Appl. No.: 272,236

[22] Filed: Jul. 8, 1994

[51] Int. Cl.⁶ .......................................................... A01C 7/00
[52] U.S. Cl. ............................. 111/174; 406/191; 406/41; 285/137.1; 285/62
[58] Field of Search ........................................ 111/174, 175, 111/176; 406/191, 196, 38, 39, 40, 41, 184, 185; 285/137.1, 62; 239/655, 664, 689, 151

[56] References Cited

U.S. PATENT DOCUMENTS

| | | | |
|---|---|---|---|
| 2,737,314 | 3/1956 | Anderson | 111/174 X |
| 3,779,584 | 12/1973 | Ignatjev | 285/137.1 |
| 4,473,016 | 9/1984 | Gust | 111/174 |
| 4,562,968 | 1/1986 | Widmer et al. | 111/175 X |
| 4,569,486 | 2/1986 | Balmer | 239/655 |
| 4,767,062 | 8/1988 | Fletcher | 239/655 |
| 4,790,484 | 12/1988 | Wall | 239/655 |
| 4,793,742 | 12/1988 | Strand | 406/79 |
| 4,834,004 | 5/1989 | Butuk et al. | 406/41 X |
| 4,843,983 | 7/1989 | Olson | 111/174 |
| 4,872,785 | 10/1989 | Schrage et al. | 406/41 X |
| 4,886,208 | 12/1989 | Strand | 239/77 |
| 5,114,078 | 5/1992 | Takata | 239/655 |
| 5,170,730 | 12/1992 | Swallow | 111/174 |

*Primary Examiner*—Dave W. Arola
*Assistant Examiner*—Victor Batson
*Attorney, Agent, or Firm*—Rudnick & Wolfe

[57] ABSTRACT

A system for delivering particulate material from a common hopper to row units mounted on each of first and second pivotally interconnected frame sections of an agricultural implement. The delivery system includes a first series of conduits for directing particulate material from the hopper to the row units mounted on the first frame section of the implement and a second series of conduits. Each conduit in the second series of conduits includes a first tube leading from the hopper, a second tube leading from a particular row unit on the second frame section of the implement, and a split manifold coupling for connecting free ends of the tubes in the second series of conduits thereby defining enclosed passages leading from the hopper to each row unit on the second frame section of the implement which is adapted to receive material from the hopper.

22 Claims, 4 Drawing Sheets

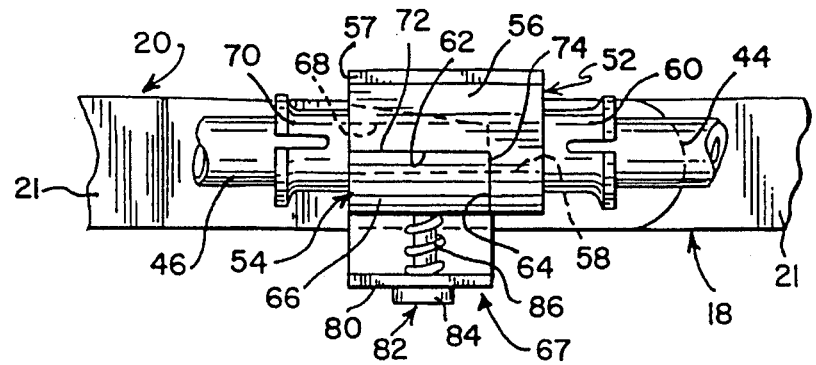
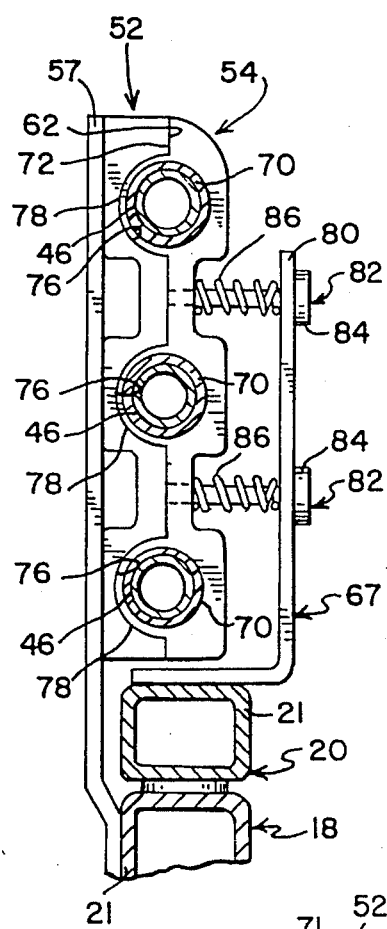
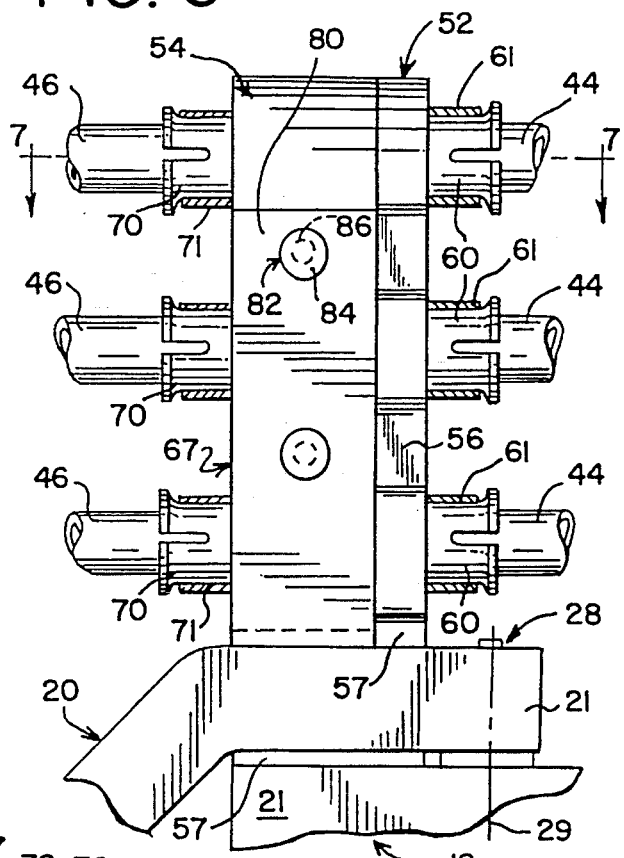
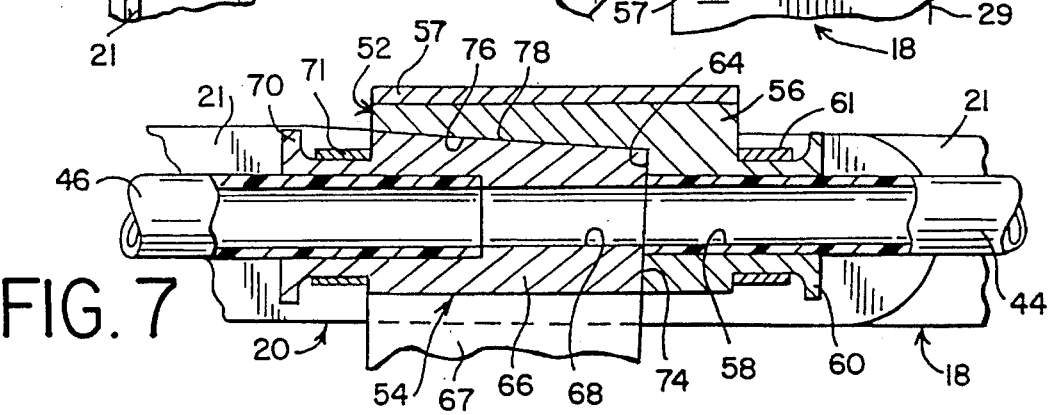

DELIVERY SYSTEM FOR A FOLDABLE AGRICULTURAL IMPLEMENT

FIELD OF THE INVENTION

The present invention generally relates to foldable implements and, more particularly, to a system for delivering materials to row units mounted on the implement.

BACKGROUND OF THE INVENTION

Agricultural implements such as planters and fertilizers are commonly known in the agricultural industry. Such implements typically include a wheeled and elongated frame assembly having a plurality of row units mounted thereon for distributing particulate material as the implement is pulled across a field. Each row unit receives materials from a common material hopper. To effect the delivery of materials, a series of elongated tubes or conduits pneumatically transfer material from the hopper to the individual row units.

To reduce the number of passes a farmer must make across a field and to increase implement efficiency, farm implement manufactures have been making larger and wider frame assemblies for the implements. By increasing the width of the frame assembly, the number of row units that can be mounted on the implement is likewise increased. As the width of the implement frame assembly has increased, however, transportation of the implement from field to field has become more difficult. Moreover, the increased width of the implement frame assembly inhibits its passage through barn doors as well as gates and fences surrounding the field.

Agricultural manufacturers have offered a variety of approaches to overcome the transportation problem inherent with such large agricultural implements. One of the more popular approaches involves dividing the implement frame assembly into a main section with one or more wing sections being hingedly or pivotally connected to one or both ends of the main section. Each section of the implement frame assembly has one or more row units mounted thereon. As is well known in the art, the pivotal connections allow each wing section to move either horizontally forwardly or horizontally rearwardly relative to the main section or vertically relative to the main section. In those implements wherein the wing sections are horizontally folded relative to the main section, the vertical axis about which the wing section moves is typically spaced inwardly from a distal end of the tool bar on the main section to minimize the width of the implement in a folded condition.

As will be appreciated by those knowledgeable with such large agricultural equipment, at least some of the row units mounted on the wing sections receive particulate material from the material hopper on the main section. The conduits or tubing leading from the hopper to the individual row units mounted on the wing sections has to be extra long to allow the wing sections to be folded relative to the main section. While the materials passing from the hopper toward the individual row units is carefully metered, the additional lengths of tubing required to allow the wing section to move to a folded position can be detrimental to the accuracy of material flow toward the row units. As an example, in a planter, the additional lengths of tubing could be detrimental to the accuracy of the flow of seed toward the row unit. Accordingly, the additional length of tubing could be detrimental to the seed spacing accuracy. Moreover, the additional length of tubing tends to crimp as a result of the folding movement of the wing section relative to the main section thereby inhibiting the flow of material through the tubing.

U.S. Pat. No. 4,843,983 discloses a pneumatic delivery system having telescoping tube sections in an attempt to solve the problem associated with elongated tubes leading between the hopper and the individual row units on the implements. Such a design, however, normally requires the tubing to be relatively rigid to allow the telescoping ends of the tubes to cooperate with each other. Of course, rigid telescoping tubes are subjected to breakage problems especially in an environment such as planters wherein the tubes are susceptible to damage and possible breakage as the farmer moves thereabout. Rigid tubes normally have a larger diameter than other forms of tubings. Of course, both the movable wing section and main section of the implement must be on relatively level ground surfaces in order for the telescoping tubes to properly orientate themselves relative to each other when the wing section is folded into an operable position relative to the main section of the implement.

To effect telescoping movements between the tube sections, one tube must have a smaller diameter than the other tube with which it is adapted to telescope. Accordingly, a circumferential step of decreased diameter is inherently formed on the inside of the telescoping tubes. The step formed between the telescoping sections of the tubes can prove problematical in that such a step obstructs free passage of relatively light material moving therepast. Those implements having wing sections which horizontally move about a generally vertical axis spaced inwardly from the distal ends of the tool bar associated with the main section further complicates the ability of the rigid tubes to accurately align and telescope relative to each other.

Thus, there remains a need and a desire for a system for delivering material to individual row units arranged on an implement including at least one wing section having row units thereon and which is foldable relative to a main section of the implement.

SUMMARY OF THE INVENTION

In view of the above, and in accordance with the present invention there is provided an a particulate matter delivery system for an agricultural implement. The system of the present invention serves to deliver particulate matter from a common hopper to at least one row unit mounted on each of first and second articulately interconnected frame sections of the implement. The delivery system includes a first series of fixed length conduits for directing particulate matter from the storage hopper to each row unit on the first frame section of the implement and a second series of conduits. Each conduit in the second series of conduits includes a first tube leading from the hopper, a second tube leading from a particular row unit on the second frame section of the implement, and a split manifold coupling for connecting the free ends of the tubes in the second series of conduits thereby defining closed passages leading from the hopper to each row unit on the second frame section of the implement that is adapted to receive material from the hopper.

In a preferred form of the invention, the split coupling is arranged proximate to the articulate connection between the frame sections of the implement. The split coupling preferably includes first and second couplings which nest relative to each other when the frame sections of the implement are arranged in an operational position relative to each other and which automatically and cleanly separate from each other immediately upon movement of the wing section toward a folded position. The first coupling is connected to the first frame section of the implement and the second coupling is connected to and movable with the second frame section of the implement. In the illustrated form of the invention, the first coupling defines a series of holes each of which individually opens to the tubes leading from the hopper. Similarly, the second coupling defines a series of holes each of which individually opens to the tubes leading from the row units mounted for movement with the second frame section. In a preferred form of the invention, the first and second couplings further include cooperative cam surfaces for effecting alignment of the holes in the first and second couplings when the frame sections are arranged axial alignment relative to each other.

In a most preferred form of the invention, a resilient mounting is provided to mount at least one coupling of the split manifold to a respective frame section of the implement. One form of such resilient mounting includes a rigid and upstruck member having one of the couplings of the split manifold coupling connected thereto. Resilient springs bias the coupling outwardly and away from the upstruck member and serve to press the coupling toward the other coupling of the split manifold. When the sections of the implement are arranged in an operational position relative to each other, the couplings of the split manifold are brought into a nesting relationship relative to each other thereby serving to enhance the sealing capability of the split coupling and to inhibit particulate material from inadvertently escaping between the couplings of the split manifold.

The delivery system proposed by the present invention reduces the lengths of tubing normally required to allow the frame sections of the implement to be articulately moved relative to one another. Eliminating the extra length of tubing promotes accurate delivery of material through conduits having a shortened length. The simplified split coupling design inherent with the present invention allows the tubing leading to the row units on the second frame section to be coupled and decoupled in an automatic manner in response to articulate movement of the wing section relative to the main section. The simplified split coupling eliminates telescoping tube sections and the need to provide different diameters for the tubes leading to the row units on the wing sections of the implement. Understandably, the ability of the split manifold to respond to articulate movement of the wing section, allows the tubes to remain in generally fixed relation to a respective section thereby substantially reducing the likelihood of the tubes crimping and thereby improving the delivery of particular matter through the delivery system.

These and other numerous features and advantages of the present invention will become readily apparent from the following detailed description, the independent drawings and the accompanying claims.

BRIEF DESCRIPTION OF THE DRAWINGS

FIG. 4 is an enlarged plan view of the split manifold coupling schematically illustrated in FIG. 3;

FIG. 6 is a front elevational view of the split coupling illustrated in FIG. 4;

FIG. 7 is an enlarged sectional view taken along lines 7—7 of FIG. 6; and

FIG. 8 is a side elevational view of the split coupling illustrated in FIG. 4;

DETAILED DESCRIPTION OF A PREFERRED EMBODIMENT

Figure 1:
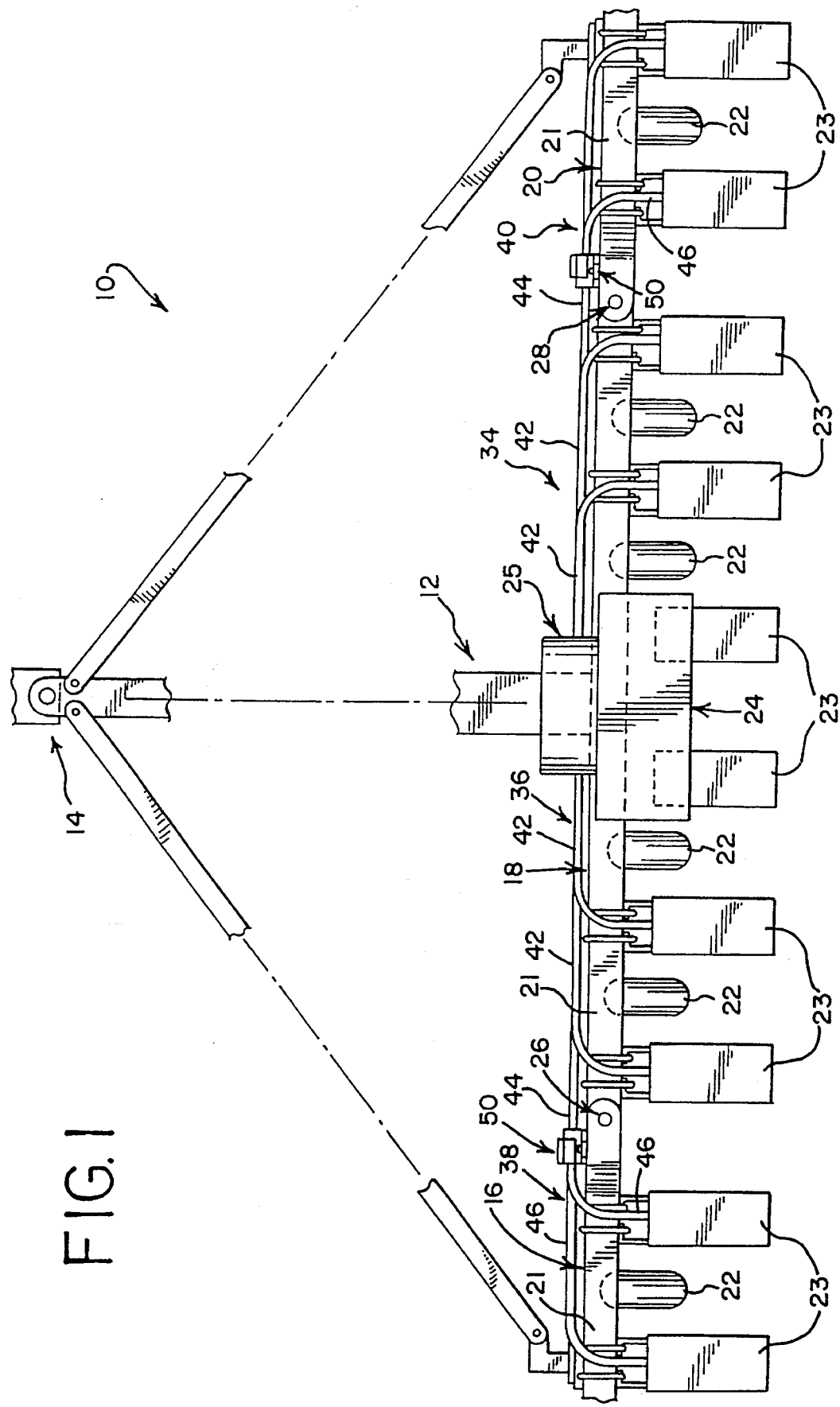
FIG. 1 is a plan view of an agricultural implement embodying principles of the present invention.

While the present invention is susceptible of embodiment in various forms, there is shown in the drawings and will hereinafter be described a preferred embodiment of the invention with the understanding that the present disclosure is to be considered as setting forth an exemplification of the invention which is not intended to limit the invention to the specific embodiment illustrated.

Referring now to the drawings, wherein like reference numerals refer to like parts throughout the several views, there is shown in FIG. 1 an agricultural implement 10 such as a planter or the like which distributes particulate material onto the ground. Implement 10 includes an elongated and wheeled frame assembly 12 that is pulled behind and across a field when the frame assembly 12 is coupled, as by hitch assembly 14, to a suitable off-highway tractor of the like (not shown). In the illustrated embodiment, the frame assembly is divisible into at least three sections 16, 18 and 20. As well known in the art, each section 16, 18 and 20 includes an elongated tool bar 21. The tool bar 21 associated with each section 16, 18 and 20 is conventionally supported by wheels 22 and extends generally parallel to the top surface of the ground over which the implement moves. A plurality of row units 23 are independently mounted to the tool bar 21 of each section 16, 18 and 20 in side-by-side relation relative to each other.

The implement 10 further includes at least one material hopper 24 preferably mounted on and carried by the main or central section 18 of the frame assembly 12. The hopper 24 is configured to hold particulate matter such as seeds, fertilizer, or the like therewithin for delivery to the row units 23 for subsequent delivery to the ground. As is known in the art, hopper 24 includes a conventional distributor 25 for metering particulate matter to the row units in a predetermined manner.

As shown in FIG. 1, the sections 16, 18 and 20 of assembly 12 are arranged in an operational position whereat the wing sections 16 and 20 are each disposed in general axial alignment with the main section 18 and each other. To promote transportation of the implement 10, however, the frame sections 16, 18 and 20 are articulately coupled to one another so that the wing sections 16 and 20 are movable to a folded position relative to the main section 18.

Between the sections 16 and 18 of frame assembly 12 there is provided a conventional pivotal connection 26 that allows wing section 16 to be folded away frown frame section 18. Similarly, between sections 18 and 20 of frame assembly 12 there is provided a conventional pivotal connection 28 that allows wing section 20 be folded away from main frame section 18. The pivotal connections 26 and 28 may be of any suitable type well known in the art and are preferably substantially similar to each other.

Figure 2:
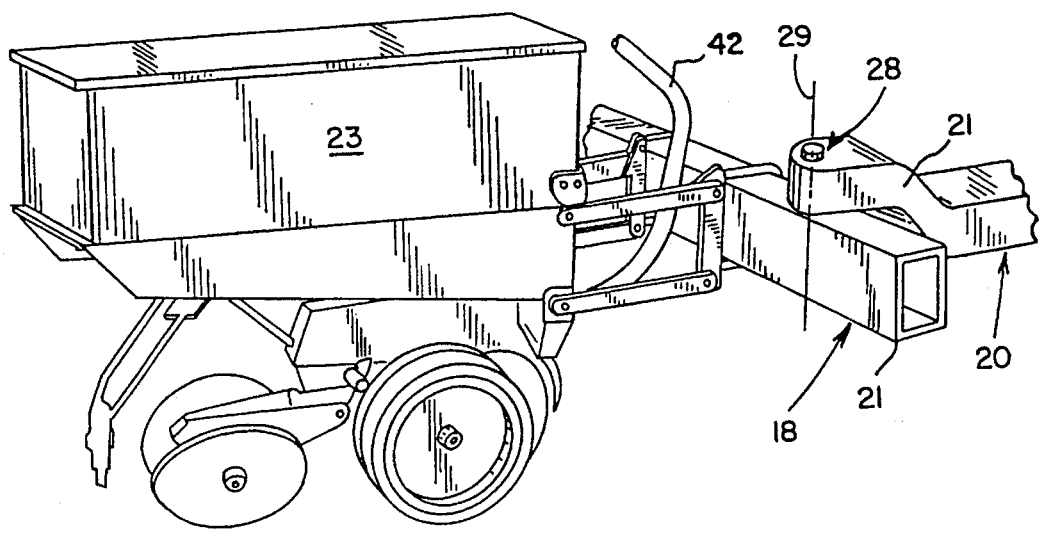
FIG. 2 is a perspective view of a row unit mounted to a frame of an agricultural implement.
Figure 3:
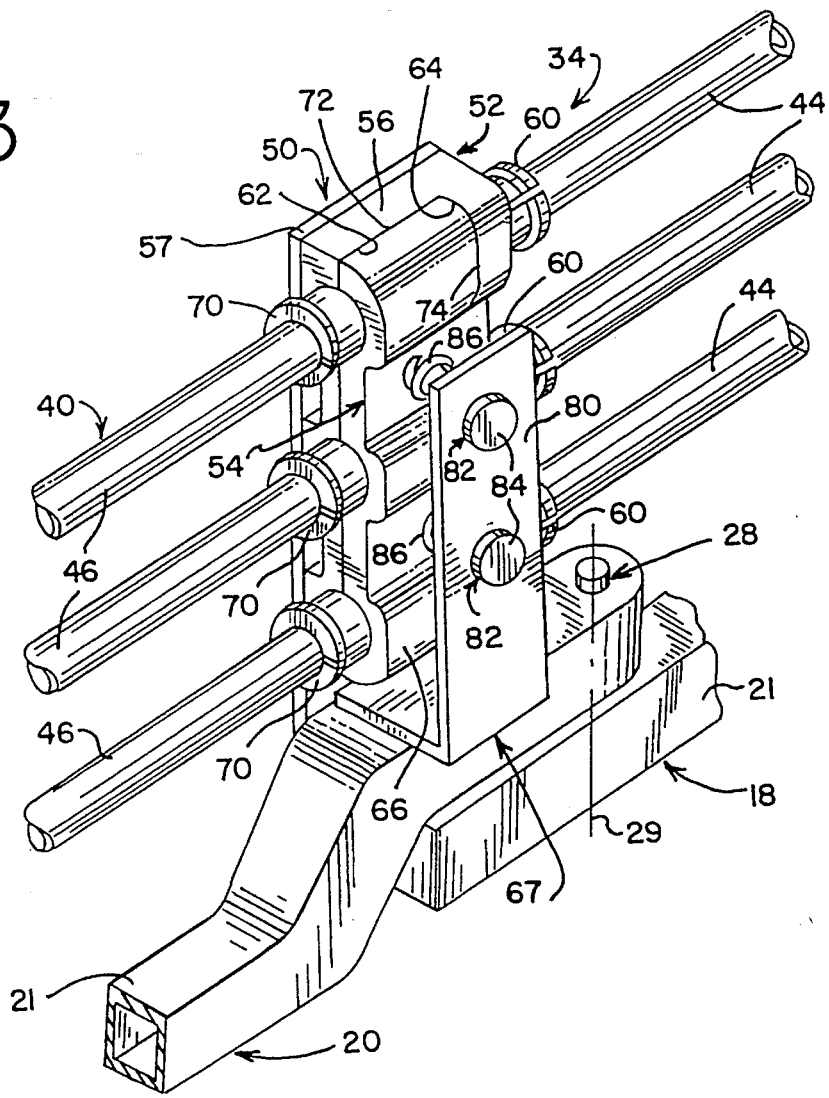
FIG. 3 is a perspective view of a split manifold coupling forming part of the present invention.

In the illustrated embodiment, the pivotal connections 26 and 28 allow the wing sections 16 and 20 to be folded generally horizontally and forwardly relative to main frame section 18. Since the pivotal connections 26 and 28 are substantially similar to each other, only pivotal connection 28 will be described in detail with the understanding that pivotal connection 26 is substantially similar. As shown in FIGS. 1, 2 and 3, adjacent ends of the tool bars 21 associated with sections 18 and 20 are arranged in vertical relation to and extends inwardly past each other. As well known in the art, the pivotal connection 28 is spaced inwardly from the distal end of the tool bar 21 associated with the main section 18 and defines a generally vertical axis 29 about which wing section 20 moves. Inwardly spacing each pivotal connection from the free end of the tool bar 21 associated with the main frame 18 minimizes the width of the frame assembly 12 when the wing sections 16, 20 are folded relative to the main section 18.

Alternatively, and without detracting form the spirit or scope of the present invention, the pivotal connections 26 and 28 could be designed to allow wing sections 16 and 20 to move vertically relative to the main section 18 of frame assembly 12. Moreover, the pivotal connections 26 and 28 can be designed to allow the wing sections 16 and 20 to move horizontally and rearwardly from the position shown in FIG. 1 to a folded position to facilitate transport of the implement. Understandably, the principles of the present invention equally apply to whether the wing sections 16, 20 are connected to the main section 18 to allow movement in any of the three directions. For purposes of simplicity and brevity, however, the present invention will be described with pivotal connections 26 and 28 that allow the wing sections 16 and 20 of frame assembly 12 to move from the position shown in FIG. 1 horizontally and forwardly of the main frame section 18 to a transport position whereat the respective tool bars 21 on the wing sections 16 and 20 are arranged generally parallel to each other.

Notably, each row unit 23 on the wing sections 16 and 20 is spaced a predetermined distance from the distributor 25 on the hopper when the sections 16. 18 and 20 are arranged in an operational position relative to each other. The configuration of the frame assembly 12 is conventional and is such that when the wing sections 16 and 20 of frame assembly 12 are folded relative to the main section 18, the row units 23 on the wing sections 16 and 20 are spaced a distance different from the distributor 25 on the hopper 24 than when the wing sections 16 and 20 are in an operational position relative to the main section 18. The elongated distance between the outermost row units on the wing sections 16, 20 that receive materials from the hopper 24 coupled with changing distances of the row units relative to the distributor 25 on hopper 24 complicates the delivery of particulate materials to the row units on the wing sections 16 and 20 of frame assembly 12. In the illustrated embodiment, the distributor 25 is a conventional mechanism that issues metered quantities of particulate material from the hopper 24 to the row units in a pneumatic stream of air which can take the form of either a vacuum or a pressurized stream of air.

A pneumatic delivery system according to the present invention, and generally indicated by reference numeral 34, is provided for delivering materials to those row units 23 mounted on the frame assembly 12 which are adapted to receive particulate materials from the hopper 24. In the illustrated embodiment, the delivery system 34 includes a first set of conduits 36 for delivering particulate material from the hopper 24 to the row units 23 mounted on the central or main frame section 18, a second set of conduits 38 for delivering particulate material to those row units 23 mounted on wing section 16 of frame assembly 12 which receive materials from hopper 24, and a third set of conduits 40 for delivering particulate materials to those row units 23 mounted on the wing section 20 of frame assembly 12 that are adapted to receive materials frown hopper 24.

It is also within the spirit and scope of the present invention that a hopper 24 could alternatively be provided on each wing section 16, 20 of the frame assembly 12 with no hopper 24 being provided on the main section 18. In such an alternative embodiment, the first set of conduits 36 would serve to direct particulate materials from the hopper 24 to the row units 23 mounted on the respective wing section on which the hopper 24 is mounted, while the second set of conduits 38 would serve to deliver particulate matter from the hopper 24 to one or more of the row units 23 mounted on the main section 18 of the frame assembly 12.

Regardless of which embodiment is involved, the first set of conduits 36 includes a plurality of tubes 42. Each tube 42 in the first set of conduits preferably has a fixed length with one end connected to the distributor 25 and an opposite end connected to the row unit 23 on that section of the frame assembly having hopper 24 mounted thereon thereby defining an enclosed passage leading from the hopper 24 to each row unit 23 oin the respective section and through which particulate material is pneumatically delivered. Each tube 42 is preferably a form of plastic or rubber and has an outside diameter ranging between about 0.875 inches and about 1.375 inches and has some flexibility along substantially its entire length. In the illustrated embodiment, those tubes 42 in the first set of conduits 36 leading to the outermost row units 23 on the main section 18 will have a different length than those tubes 42 leading to those row units 23 mounted more inwardly toward the material hopper 24 on the main section 18.

In the illustrated embodiment, the second and third sets of conduits 38 and 40, respectively, are substantially similar to each other. Accordingly, only the third set of conduits 40 will be discussed in detail, with the understanding that the second set of conduits 38 is substantially similar in structure.

As shown in FIG. 3, each conduit in the set of conduits leading to the row units 23 (FIG. 1) on the wing sections of frame assembly 12 has a multipiece construction including a first tube 44 leading from the distributor 25 on hopper 24, and a second tube 46 leading from each row unit mounted on the wing section that is adapted to receive materials from the hopper 24. As will be appreciated, the number of tubes 44, 46 leading to the row units 23 on the respective wing section will be determined by the number of row units 23 mounted on a particular wing section of the implement which receive particulate matter from the hopper 24.

The tubes 44 and 46 each have an outer diameter ranging between about 0.875 inches to about 1.375 inches. In the preferred form of the invention, each tube 44, 46 is preferably a form of rubber, plastic or the like and has some flexibility along its entire length to reduce damage and possible breakage thereto during use of the implement. As will be explained in detail below, since the tubes 44, 46 are not required to move relative to their respective frame sections, it is also within the spirit and scope of the invention to fabricate the tubes 44, 46 from a more rigid material which could include a form of nonflexible plastic or the like.

As will be appreciated, the lengths of each tube 44 leading from the distributor 25 are substantially equal to each other. The length of each tube 46 leading from the row units 23 mounted on the wing sections will vary depending upon the location of the row units along the length of the tool bar 21 associated with the wing section of the frame assembly.

The free ends of the tubes 44 and 46 of each conduit in the set of conduits leading to the row units 23 on the wing sections are joined to each other by a split manifold coupling 50. The split manifold coupling 50 is disposed between the free ends of the tubes 44 and 46 whereby establishing an enclosed passage between the distributor 25 of hopper 24 and those row units 23 mounted on the respective wing section which receive particulate materials from hopper 24 as long as the sections of frame assembly 12 are in an operational position relative to each other.

As shown in FIG. 3, each split manifold coupling 50 is preferably mounted proximate to a respective pivotal connection on the frame assembly 12 and includes first and second manifolds 52 and 54, respectively, which, when brought together as the wing sections are swung into an operational position relative to the main section of the frame assembly, define a portion of the enclosed passage leading between the hopper 24 and the row units 23 mounted on the respective wing section. In the illustrated embodiment, the first manifold 52, also known as the fixed manifold, is mounted in fixed relation to the main frame section 18 of the frame assembly 12. The second manifold 54, also known as the movable manifold, is mounted in fixed relation to and is movable with the respective wing section.

Figure 5:
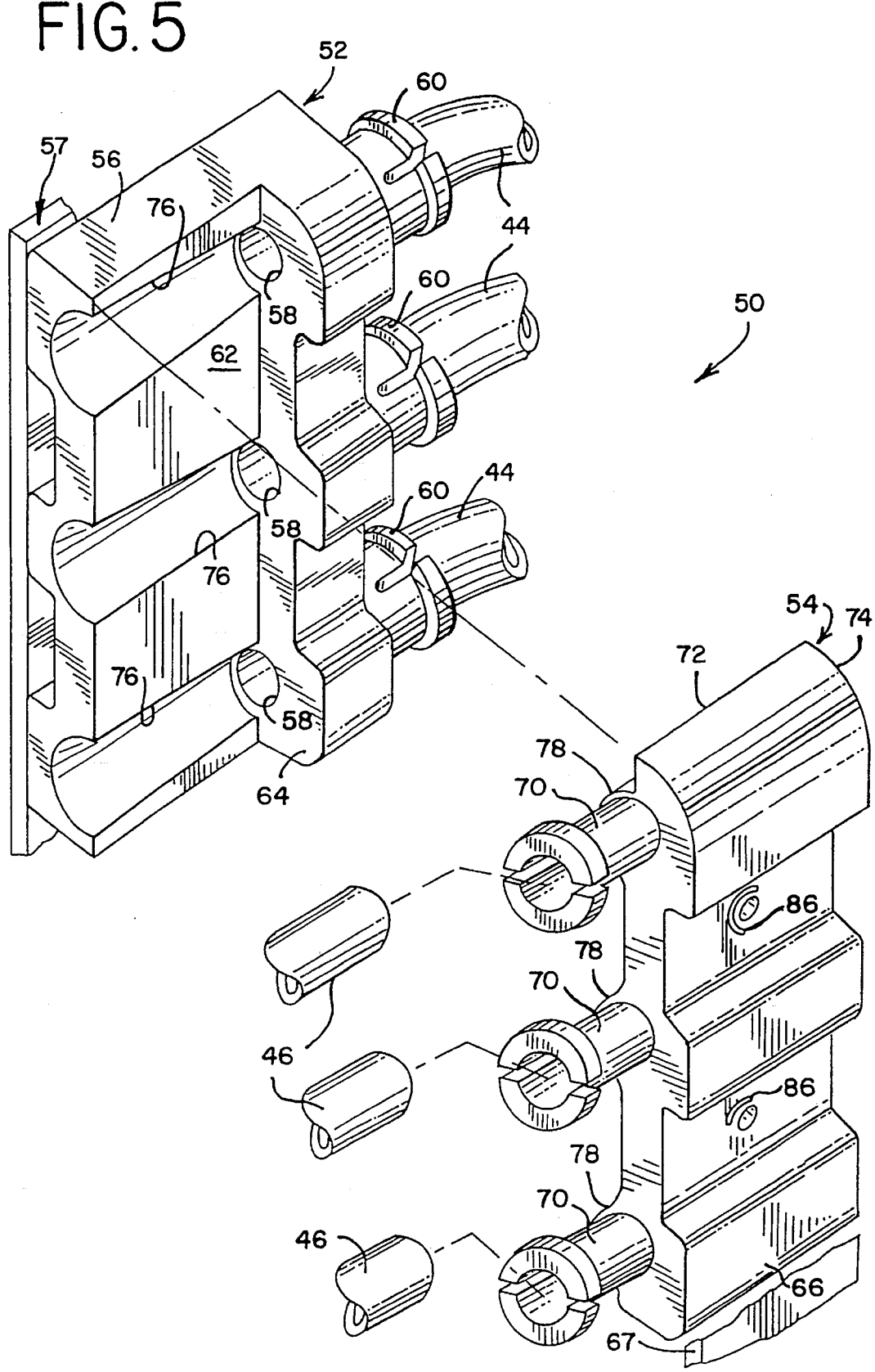
FIG. 5 is a perspective view of the manifolds forming the split manifold coupling.

As shown in FIGS. 4, 5 and 6, the first manifold 52 preferably includes an elongated body 56 that is mounted to the main section 18 of frame assembly 12 as by a suitable mounting bracket 57. Similarly, the second manifold 54 preferably includes an elongated body 66 that is mounted to and movable with the respective wing section of frame assembly 12 as by a suitable mounting bracket 67. In the illustrated embodiment, and because the coupling 50 is associated with the frame assembly 12 that includes wing sections that move horizontally and forwardly, the manifolds 52 and 54 are configured such that the effectiveness of each coupling 50 is responsive to the fore-and-aft displacement of the respective wing section relative to the main section of the frame assembly 12.

As shown in FIGS. 4 and 5, the elongated body 56 of manifold 52 defines a series of vertically spaced holes or openings 58 therein. To promote the passage of particulate material therethrough, the holes or openings 58 in manifold 52 extend generally parallel to the tool bar 21 of the main section 18 of frame assembly 12. Similarly, the body 66 of manifold 54 includes a series of holes or openings 68 (FIG. 7) which extend generally parallel to the tool bar 21 associated with the respective wing section on which manifold 54 is mounted. As will be appreciated, the number of holes or openings 58 and 68 in the elongated bodies 56 and 66 of the manifold coupling 50 generally correspond to the number of conduits associated with each manifold coupling 50. Moreover, in the direction of particulate material flow, the diameters of the holes or openings 58 and 68 will preferably be increasing in size such that there will be no steps or sharp corners in the passage defined thereby which would hinder or otherwise interfere with the transitional flow of material from one tube to the other.

As shown in FIG. 7, each hole or opening 58 in body 56 of manifold 52 is configured to accommodate a free end of a respective tube 44 therewithin. In the illustrated embodiment, a split annular grip 60 extends from body 56 in axial alignment with each hole or opening 58 for removably accommodating and securing the free end of a respective tube 44 in association with a respective hole or opening 58 in the manifold 52. In the illustrated form of the invention, a conventional clamp 61 (FIG. 7) is releasably secured about the grip 60 for releasably securing the free end of tube 44 in association with the respective grip 60. Similarly, each hole 68 in body 66 of manifold 54 is configured to accommodate a free end of a respective tube 46 therewithin. In the illustrated embodiment, a split annular grip 70 extends from body 66 of manifold 54 for removably accommodating and securing the free end of a respective tube 46 in association with each hole 68 in the manifold 54. In the illustrated form of the invention, a conventional clamp 71 (FIG. 7) is releasably secured about the grip 70 for removably securing the free end of tube 46 in association with the respective grip 70.

To promote alignment between the openings 58 and 68 defined by manifolds 52 and 54, when the wing sections and main section are arranged in an operational position relative to each other, the bodies 56 and 66 of manifolds 52 and 54, respectively, are preferably nested relative to each other. In a most preferred form of the invention body 56 of manifold 52 has a generally L-shaped cross sectional configuration having a front face 62 joined to a side face 64. As shown, the holes or openings 58 in body 56 open to the side face 64. Body 66 of manifold 54 has a rear face 72 joined to a side face 74. As shown, the holes or openings 68 in body 66 open to the side face 74. When the wing section and main section are in an operational position relative to each other, the front face 62 of manifold 52 preferably mates with the rear face 72 of manifold 54, while the side face 64 of manifold 52 is preferably arranged in confronting and mating relation relative to the side face 74 of manifold 54.

To further promote alignment between the openings 58 and 68 defined by manifolds 52 and 54 thereby enhancing the pneumatic flow of particulate matter through the passage, the manifolds 52 and 54 are preferably further provided with cooperative cam surfaces thereon. In the illustrated embodiment, and as best seen in FIG. 5, the front face 62 of manifold 52 is provided with vertically spaced cam surfaces 76. Similarly, the rear face 72 of manifold 54 is provided with vertically spaced cam surfaces 78.

In a most preferred form of the invention, each cam surface 76 has an elongated and generally convex configuration extending inwardly from the front face 62 of manifold 52. Notably, each cam surface 76 has an elongated lateral configuration which is arranged in axial alignment with the holes or openings 58 defined by the vertically elongated body 56 of manifold 52. Similarly, each cam surface 78 has an elongated and generally concave configuration extending away from the rear face 72 of manifold 54. Notably, each cam surface 78 has an elongated lateral configuration which is centered on the longitudinal axis of the holes or openings 68 defined by the elongated vertically body 66 of manifold 54.

As best shown in FIGS. 5 and 7, in a most preferred form of the invention, each cam surface 76 on manifold 52 has a tapering configuration in a lateral direction. That is, each cam surface 76 on manifold 52 is smaller in diameter at that end proximate to the side wall 64 than at an opposite end thereof. The cam surface 78 on manifold 54 preferably has an elongated and tapered configuration extending in a lateral direction that is complimentary to the cam surface 76 on manifold 52. That is, each cam surface 78 on manifold 74 is smaller in diameter at that end proximate to the side wall 74 adapted to nest relative to side wall 64 of manifold 52 than at an opposite end thereof.

As shown in FIGS. 6 and 8, the manifold 54 of each split manifold coupling 50 is preferably resiliently mounted to a respective wing section of frame assembly 12. As mentioned above, manifold 54 is mounted to a respective wing section by the mounting bracket 67. As shown, mounting bracket 67 is preferably configured with an upstanding leg 80 which extends generally parallel to but spaced in a fore-and-aft direction frown the manifold 54. A pair of vertically spaced fasteners 82 slidably pass through leg 80 of bracket 67 and have one end secured to the manifold 54. An opposite end of each fastener 82 is provided with a cap 84 which abuts against the leg 80 and limits movement of the manifold 54 away from bracket 67. A pair of compression springs 86 are fitted between the leg 80 of bracket 67 and the manifold 54. Preferably, the springs 86 are slidably arranged about the fasteners 82 and serve to resiliently urge the manifold 54 away from the leg 80 of bracket 67. Moreover, the springs 86 serve to minimize damage and correct for misalignment problems between the manifolds 52 and 54 of a respective coupling when the sections of the frame assembly 12 are brought into an operational position relative to each other.

In an operational position, the sections 16, 18 and 20 of frame assembly 12 are arranged in axial alignment relative to each other. When the sections 16, 18 and 20 of frame assembly 12 are in their operational position relative to each other, particulate matter such as seeds, fertilizer or the like can be pneumatically delivered from the hopper 24 in metered quantities to the row units 23 on the frame assembly 12. In the illustrated form of the invention each tube 42 in the first set of conduits defines a closed pneumatic passage between the hopper 24 and the row units 23 on the main section 18 thus facilitating delivery of particulate matter to the row units 23 on the main section 18. As long as the wing sections 16 and 20 remain in an operational position relative to the main section 18, the manifolds 52 and 54 of each split coupling 50 pneumatically join the tubes 44 and 46 of the other sets of conduits thereby defining an enclosed pneumatic passage between the hopper 24 and the row units 23 on the respective wing sections 16 and 20 which are adapted to receive particulate material from the hopper 24.

When the wing sections 16 and 20 are moved to a transport position, the tubes 46 and manifold 54 advantageously move with the respective wing sections, while manifold 52 and tubes 44 remain fixed or stationary relative to the main section 18. As the wing sections 16 and 20 are moved to a transport position, the manifold 54 of the respective split coupling is released from its nested relationship relative to manifold 52 thereby allowing the wing section to move to its transport position.

The provision of the split manifold 50 in the conduit structure leading to the row units 23 on the wing sections which receive particulate material from hopper 24 eliminates the necessity of adding extra lengths to those tubes for delivering pneumatic material to the row units on the wing sections. Eliminating the extra length tubing greatly improves the pneumatic delivery of particulate material to the row units. As will be appreciated, and especially on the outermost row units 23 mounted the wing sections, the combined length of tubes 42 and 44 of the conduit structure leading thereto is shorter than a conventional one-piece tube used to deliver particulate material to the row units. The shorter length tubing furthermore improves the accuracy of material flow. As will be appreciated by those skilled in the art, it is significantly easier to align the couplings 52 and 54 of the split coupling than to effect telescoping movements of the free ends of tubing relative to each other. Moreover, using a split coupling allows the tubes 42 and 44 to remain stationary relative to the section of the frame assembly with which they are associated thereby eliminating binding of the tubes when the wing sections are folded and thus avoiding pinch points along the length of the tubes.

When the wing sections are moved frown their folded position into an operational position, the manifolds 52 and 54 of the split coupling 50 automatically couple relative to each other to rejoin the tubes 42 and 44 to provide a closed passage between the hopper 24 and those row units on the wing sections which are adapted to receive particulate material from the hopper 24. Notably, the passageway defined by the coupling 50 has an unobstructed configuration thereby facilitating the flow of particulate material therethrough. Moreover, the cam surfaces 76 and 78 on the manifolds 52 and 54, respectively, facilitate alignment of the openings 58 and 68 in the manifolds 52 and 54, respectively when the manifolds 52 and 54 return to a nested relationship relative to each other. In the preferred form of the invention, the longitudinal tapering configuration on the camming surfaces 76 and 78 promotes maintaining the nesting relationship between the elongated bodies 56 and 66 of the manifolds 52 and 54, respectively, when the wing respective section is aligned in an operational position relative to the main section. The resilient mounting arrangement 67 of at least one of the manifolds 52 and 54 compensates for misalignment problems between the manifolds 52 and 54 while furthermore facilitating their stacked or nested relationship relative to each other thereby promoting the delivery of material through the passageway toward the row units which are adapted to receive particulate material from the hopper 24.

From the foregoing, it will be observed that numerous modifications and variations can be effected without departing from the true spirit and scope of the novel concept of the present invention. It will be appreciated that the present disclosure is intended as an exemplification of the invention, and is not intended to limit the invention to the specific embodiment illustrated. The disclosure is intended to cover by the appended claims all such modifications as fall within the scope of the claims.

What is claimed is:

1. An agricultural implement comprising:

an elongated frame assembly including first and second frame sections, said frame sections being joined to each other for movement about a pivotal connection between an operational position whereat said frame sections are in general axial alignment relative to each other and a folded position wherein the frame sections are folded away from each other to promote transportation of the implement;

a material hopper mounted on at least one of said frame sections of the frame assembly;

a plurality of row units being mounted on said frame assembly, with at least one row unit being mounted on said first frame section and at least one row unit being mounted on said second frame section; and a pneumatic system for delivering materials to each of said row units on the first and second frame sections, said system comprising a first one-piece conduit for pneumatically delivering materials from said hopper to said at least one row unit on the frame section on which said hopper is mounted and a second multipiece conduit for pneumatically delivering material from said hopper to said at least one row unit on the other frame section, said second conduit comprising a first tube leading from said hopper, a second tube leading from said at least one row unit on said other frame section, and a split manifold mounted proximate to the pivotal connection on the frame assembly and including a first and second manifolds which, when brought together, define an enclosed passage through which materials are transferred between said first and second tubes, said first manifold being fixedly connected to the frame section on which said hopper is mounted and having a free end of the first tube leading to an opening defining a portion of the passage of said split manifold, said second manifold being connected to the other frame section for movement therewith and having a free end of said second tube leading to an opening defining a remaining portion of the passage of said split manifold, said first and second manifolds further including cooperative cam surfaces for effecting alignment between said first and second openings when the frame sections are moved into an operative position relative to each other thereby facilitating the passage of materials from said hopper to said at least one row unit mounted on said second frame section and through said passage in the split manifold.

2. The agricultural implement according to claim 1 wherein, when the first and second manifolds are brought together, the passage defined by said split manifold extends generally parallel to the frame section on which said hopper is mounted.

3. The agricultural implement according to claim 1 wherein the cam surface on said second manifold at least partially surrounds the opening defined therein while the cam surface on said first manifold is arranged in axial alignment with the opening defined thereby.

4. An agricultural implement, comprising:

an elongated frame assembly including first and second frame sections that are interconnected such that the frame sections are movable relative to each other about a pivotal connection between an operational position whereat said frame sections are in general axial alignment relative to each other and a folded position wherein the frame sections are folded away from each other to promote transportation of the implement;

a material hopper mounted on one of said frame sections;

a plurality of row units mounted to each frame section of said frame assembly; and a system for delivering materials to each of said row units mounted on the first and second frame sections, said system comprising a set of elongated one-piece conduits for delivering materials from said hopper individually to said row units on the frame section having said hopper mounted thereon and a set of multipiece conduits for delivering material from said hopper individually to said row units on the other frame section, said set of multipiece conduits comprising a first series of tubes of common length relative to each other leading from said hopper, a second series of tubes leading from the plurality of row units mounted on the other frame section, and a tube coupling apparatus for creating individual passages between free ends of the first series and second series of tubes as long as said frame sections are in an operational position relative to each other, said tube coupling apparatus including first and second manifolds, said first manifold being connected to the frame section of the frame assembly having said hopper mounted thereon and to the free ends of said first series of tubes, said second manifold being connected to the other frame section of the frame assembly for movement therewith and to the free ends of the second series of tubes, and wherein said first and second manifolds each define at least a portion of the individual passages between respective free ends of the tubes comprising the set of multipiece conduits leading to said plurality of row units mounted on said other frame section of the implement.

5. The agricultural implement according to claim 4 wherein the delivery of material through the conduits of the delivery system is facilitated by forced air flowing through the sets of conduits.

6. The agricultural implement according to claim 4 wherein the pivotal connection between said frame sections permits horizontal and forward movement of the frame sections relative to each other, and wherein said tube coupling apparatus is mounted laterally proximate to the pivotal connection between the frame sections.

7. The agricultural implement according to claim 4 wherein said first manifold includes front and side faces, said second manifold includes rear and side faces, with the front and side faces of said first manifold being arranged in mating and confronting relation relative to the rear and side faces of the second manifold when the frame sections are in an operational position relative to each other.

8. The agricultural implement according to claim 4 wherein each manifold defines at least one laterally extending opening which defines at least a part of the passage between the free ends of the tubes.

9. The agricultural implement according to claim 4 wherein at least one of the manifolds is mounted to its respective frame section for resilient fore-and-aft movement within a predetermined range of movements thereby allowing for misalignment between the manifolds while enhancing the mating relationship between the manifolds when the frame sections are in an operational position relative to each other.

10. An agricultural implement, comprising:

an elongated frame assembly including first and second frame sections that are interconnected such that the frame sections are movable relative to each other about a pivotal connection between an operational position whereat said frame sections are in general axial alignment relative to each other and a folded position wherein the frame sections are folded away from each other to promote transportation of the implement;

a material hopper mounted on one of said frame sections;

a plurality of row units mounted on said frame assembly, with at least one row unit being mounted on said first frame section and at least one row unit being mounted on said second frame section; and a system for delivering materials to each of said row units mounted on the first and second frame sections, said system comprising a first elongated one-piece conduit for delivering materials from said hopper to said at least one row unit on the frame section having said hopper mounted thereon and a second multipiece conduit for delivering material from said hopper to said at least one row unit on the other frame section, said second multipiece conduit comprising a first tube leading from said hopper, a second tube leading from said at least one row unit mounted on the other frame section, and a tube coupling apparatus for creating a passage between free ends of the first and second tubes as long as said frame sections are in an operational position relative to each other, said tube coupling apparatus including first and second manifolds, said first manifold being connected to the frame section having said hopper mounted thereon and to the free end of said first tube, and with said first manifold including front and side faces, said second manifold being connected to the other frame section for movement therewith and to the free end of the second tube, with said second manifold including rear and side faces, with the front and side faces of said first manifold being arranged in mating and confronting relation relative to the rear and side faces of the second manifold when the frame sections of the frame assembly are in an operational position relative to each other, and wherein said first and second manifolds each define at least a portion of the passage between the free ends of the tubes comprising the conduit leading to said at least one row unit on said other frame section of the implement.

11. The agricultural implement according to claim 10 wherein the front face of the first manifold and the rear face of said second manifold define cooperative cam surfaces thereon for effecting alignment of said manifolds relative to each other.

12. An agricultural implement, comprising:

an elongated frame assembly including first and second frame sections that are interconnected such that the frame sections are movable relative to each other about a pivotal connection between an operational position whereat said frame sections are in general axial alignment relative to each other and a folded position wherein the frame sections are folded away from each other to promote transportation of the implement;

a material hopper mounted on one of said frame sections;

a plurality of row units mounted on said frame assembly, with at least one row unit being mounted on said first frame section and at least one row unit being mounted on said second frame section; and a system for delivering materials to each of said row units mounted on the first and second frame sections, said system comprising a first elongated one-piece conduit for delivering materials from said hopper to said at least one row unit on the frame section having said hopper mounted thereon and a second multipiece conduit for delivering material from said hopper to said at least one row unit on the other frame section, said second multipiece conduit comprising a first tube leading from said hopper, a second tube leading from said at least one row unit mounted on the other frame section, and a robe coupling apparatus for creating a passage between free ends of the first and second tubes as long as said frame sections are in an operational position relative to each other, said tube coupling apparatus including first and second manifolds, said first manifold being connected to the frame section having said hopper mounted thereon and to the free end of said first tube, said second manifold being connected to the other frame section for movement therewith and to the free end of the second tube, and wherein each manifold defines at least one laterally extending opening which defines at least a part of the passage between the free ends of the tubes comprising the conduit leading to at least one row unit on said other frame section of the implement.

13. An agricultural implement, comprising:

an elongated frame assembly including first and second frame sections that are interconnected such that the frame sections are movable relative to each other about a pivotal connection between an operational position whereat said frame sections are in general axial alignment relative to each other and a folded position wherein the frame sections are folded away from each other to promote transportation of the implement;

a material hopper mounted on one of said frame sections;

a plurality of row units mounted on said frame assembly, with at least one row unit being mounted on said first frame section and at least one row unit being mounted on said second frame section; and a system for delivering materials to each of said row units mounted on the first and second frame sections, said system comprising a first elongated one-piece conduit for delivering materials from said hopper to said at least one row unit on the frame section having said hopper mounted thereon and a second multipiece conduit for delivering material from said hopper to said at least one row unit on the other frame section, said second multipiece conduit comprising a first tube leading from said hopper, a second tube leading from said at least one row unit mounted on the other frame section, and a tube coupling apparatus for creating a passage between free ends of the first and second tubes as long as said frame sections are in an operational position relative to each other, said tube coupling apparatus including first and second manifolds, said first manifold being connected to the frame section having said hopper mounted thereon and to the free end of said first tube, said second manifold being connected to the other frame section for movement therewith and to the free end of the second tube, and wherein at least one of the manifolds is mounted to its respective frame section for resilient fore-and-aft movement within a predetermined range of movements thereby allowing for misalignment between the manifolds while enhancing the mating relationship between the manifolds when the frame sections are in an operational position relative to each other, and wherein said first and second manifolds each define at least a portion of the passage between the free ends of the tubes comprising the conduit leading to said at least one row unit on said other frame section of the implement.

14. An agricultural implement for distributing particulate material onto the ground as the implement is drawn thereacross, said implement comprising:

an elongated and wheeled frame assembly including a main section and at least one wing section, said sections being joined to each other to allow said wing section to move about a pivotal connection between an operational position whereat said sections are in general axial alignment relative to each other and a folded position wherein the wing section is folded relative to the main section to reduce the lateral width of the frame assembly and promote transportation of the implement;

a material hopper mounted on one of said sections of the frame assembly for holding particulate material therewithin;

a plurality of row units mounted on said frame assembly in side-by-side relation relative to each other, with a first set of row units mounted on and movable with said main section and a second set of row units mounted on and movable with said wing section, and wherein the pivotal movement of the wing section is such that the outermost row unit in the second set of row units mounted on the wing section is spaced a first predetermined distance from the hopper when the sections are arranged in an operational position relative to each other and a second predetermined distance from the hopper when the wing section is in a folded position relative to said main section; and a system for delivering materials to each of the row units on both the main and wing sections of the implement, said system comprising a first set of fixed length one-piece conduits leading from and for individually directing particulate material from said hopper to one set of row units and a second set of conduits for individually directing particulate material from the hopper to the other set of row units, said second set of conduits comprising a first series of tubes of common length extending from the hopper, a second series of tubes of different lengths extending from said other set of row units, and a split coupling for releasably joining to each other free ends of the first series and the second series of tubes whereby a series of closed passages are defined between the hopper and each row unit of the other set of row units as long as the wing section is arranged in said operational position relative to said main section.

15. The agricultural implement according to claim 14 wherein said split coupling is arranged laterally proximate to the pivotal connection allowing the wing section to move between the operational and folded positions relative to said main section of the frame assembly.

16. The agricultural implement according to claim 14 wherein said split coupling comprises a first manifold mounted on the main section of the frame assembly, a second manifold mounted on and for movement with the wing section of the frame assembly, with each manifold comprising an elongated body defining a series of laterally extending openings which are aligned relative to each other to define a lengthwise portion of each closed passage between the hopper and each row unit of the other set of row units when the manifolds are brought together in response to the sections of the frame assembly being arranged in an operational position relative to each other.

17. An agricultural implement for distributing particulate material onto the ground as the implement is drawn thereacross, said implement comprising:

an elongated and wheeled frame assembly including a main section and at least one wing section, said sections being joined to each other to allow said wing section to move about a pivotal connection between an operational position whereat said sections are in general axial alignment relative to each other and a folded position wherein the wing section is folded relative to the main section to reduce the lateral width of the frame assembly and promote transportation of the implement;

a material hopper mounted on one of said sections of the frame assembly for holding particulate material therewithin;

a plurality of row units mounted on said frame assembly in side-by-side relation relative to each other, with a first set of row units mounted on and movable with said main section and a second set of row units mounted on and movable with said wing section; and a system for delivering materials to each of the row units on both the main and wing sections of the implement, said system comprising a first set of one-piece conduits leading from said hopper to one set of row units and a second set of conduits leading from the hopper to the other set of row units, said second set of conduits comprising a plurality of first tubes extending from the hopper, a plurality of second tubes extending from said other set of row units, and a split coupling for releasably joining free ends of the first and second plurality of tubes to each other whereby a series of closed passages are defined between the hopper and each row unit of the other set of row units as long as the wing section is arranged in said operational position relative to said main section, and wherein said split coupling comprises a first manifold mounted on the main section of the frame assembly, a second manifold mounted on and for movement with the wing section of the frame assembly, with each manifold comprising an elongated body defining a series of openings which are aligned relative to each other when the manifolds are brought together in response to the sections of the frame assembly being arranged in an operational position relative to each other, and wherein at least one of said manifolds is resiliently mounted to a respective section on the frame assembly to enhance sealing of the manifolds relative to each other thereby preventing particulate material from inadvertently escaping from the split coupling as it passes enroute to the second set of row units.

18. An agricultural implement for distributing particulate material onto the ground as the implement is drawn thereacross, said implement comprising:

an elongated and wheeled frame assembly including a main section and at least one wing section, said sections being joined to each other to allow said wing section to move about a pivotal connection between an operational position whereat said sections are in general axial alignment relative to each other and a folded position wherein the wing section is folded relative to the main section to reduce the lateral width of the frame assembly and promote transportation of the implement;

a material hopper mounted on one of said sections of the frame assembly for holding particulate material therewithin;

a plurality of row units mounted on said frame assembly in side-by-side relation relative to each other, with a first set of row units mounted on and movable with said main section and a second set of row units mounted on and movable with said wing section; and a system for delivering materials to each of the row units on both the main and wing sections of the implement, said system comprising a first set of one-piece conduits leading from said hopper to one set of row units and a second set of conduits leading from the hopper to the other set of row units, said second set of conduits comprising a plurality of first tubes extending from the hopper, a plurality of second tubes extending from said other set of row units, and a split coupling for releasably joining free ends of the first and second plurality of tubes to each other whereby a series of closed passages are defined between the hopper and each row unit of the other set of row units as long as the wing section is arranged in said operational position relative to said main section, and wherein said split coupling comprises a first manifold carried by the main section of the frame assembly, a second manifold carried by the wing section of the frame assembly, with each manifold comprising an elongated body having a series of openings extending therethrough, and wherein said split coupling further includes cooperative cam surfaces defined by said manifolds for effecting alignment of the openings in the manifolds when the sections of the frame assembly are brought together in an operating position.

19. A system for delivering particulate material to each of a plurality of row units on a wheeled frame assembly of an agricultural implement including two frame sections that are articulately connected to each other by a pivotal connection allowing one frame section to move horizontally relative to the other frame section between an operational position and a folded position, said delivery system including a hopper mounted on one frame section of the frame assembly for holding a supply of particulate material, a first series of one-piece conduits for delivering particulate material from said hopper to each of the row units mounted on that frame section of the frame assembly on which said hopper is mounted, and a second series of conduits for delivering particulate material from the hopper to the row units mounted on the other frame section of the frame assembly, said second series of conduits including a plurality of first fixed length tubes leading from the hopper and a plurality of tubes leading from each of the row units on the other frame section of the frame assembly that are adapted to receive particulate material from the hopper, and a split manifold including a first manifold connected to the plurality of first fixed length tubes and a second manifold connected to the plurality of tubes leading from the row units mounted on said other frame section of the frame assembly that receive particulate materials from the hopper, and wherein said first and second manifolds each include an elongated body connected to one of said frame sections of the implement, with each elongated body defining a series of passages therethrough such that each conduit in said second series of conduits defines an enclosed passage leading from the hopper to the row units on the other frame section of the frame assembly as long as said frame sections are disposed in a predetermined manner relative to each other and which allows the length of each conduit in said second series of conduits to be minimized without detracting from the ability of the frame sections to pivotally move horizontally relative to each other.

20. A system for delivering particulate material to each of a plurality of row units on a wheeled frame assembly of an agricultural implement including two frame sections that are articulately connected to each other by a pivotal connection allowing one frame section to move horizontally relative to the other frame section between an operational position and a folded position, said delivery system including a hopper mounted on one frame section of the frame assembly for holding a supply of particulate material, a first series of fixed length conduits for delivering particulate material from said hopper to each of the row units mounted on the frame section to which the hopper is mounted, and a second series of conduits for delivering particulate material from the hopper to the row units mounted on the other frame section of the frame assembly, said second series of conduits including a plurality of first fixed length tubes leading from the hopper and a plurality of tubes leading from each of the row units on the other frame section of the frame assembly that are adapted to receive particulate material from the hopper, and a split manifold including a first manifold connected to the plurality of first fixed length tubes and a second manifold connected to the plurality of tubes leading from the row units mounted on said other frame section of the frame assembly that receive particulate materials from the hopper, and wherein said first and second manifolds each define a series of passages therethrough such that each conduit in said second series of conduits defines an enclosed passage leading from the hopper to the row units on the other frame section of the frame assembly as long as said frame sections are disposed in a predetermined manner relative to each other and which allows the length of each conduit in said second series of conduits to be minimized without detracting from the ability of the frame sections to pivotally move horizontally relative to each other, and wherein each manifold comprises an elongated body adapted for connection to a respective section on the frame assembly, with a front side of the body of the first manifold being adapted to mate with a rear side of the body on the second manifold.

21. A system for delivering particulate material to each of a plurality of row units on a wheeled frame assembly of an agricultural implement including two frame sections that are articulately connected to each other by a pivotal connection allowing one frame section to move horizontally relative to the other frame section between an operational position and a folded position, said delivery system including a hopper mounted on one frame section of the frame assembly for holding a supply of particulate material, a first series of one-piece conduits for delivering particulate material from said hopper to each of the row units mounted on that frame section of the frame assembly on which the hopper is mounted, and a second series of conduits for delivering particulate material from the hopper to the row units mounted on the other frame section of the frame assembly, said second series of conduits including a plurality of first fixed length tubes leading from the hopper and a plurality of tubes leading from each of the row units on the other frame section of the frame assembly that are adapted to receive particulate material from the hopper, and a split manifold including a first manifold connected to the plurality of first fixed length tubes and a second manifold connected to the plurality of tubes leading from the row units mounted on said other frame section of the frame assembly that receive particulate materials from the hopper, and wherein said first and second manifolds each define a series of passages therethrough such that each conduit in said second series of conduits defines an enclosed passage leading from the hopper to the row units on the other frame section of the frame assembly as long as said frame sections are disposed in a predetermined manner relative to each other and which allows the length of each conduit in said second series of conduits to be minimized without detracting from the ability of the frame sections to pivotally, move horizontally relative to each other, and wherein said first and second manifolds define cooperative cam surfaces therebetween for facilitating alignment of the series of passages therein.

22. A system for delivering particulate material to each of a plurality of row units on a wheeled frame assembly of an agricultural implement including two frame sections that are articulately connected to each other by a pivotal connection allowing one frame section to move horizontally relative to the other frame section between an operational position and a folded position, said delivery system including a hopper mounted to one frame section of the frame assembly for holding a supply of particulate material, a first series of one-piece conduits for delivering particulate material from said hopper to each of the row units mounted on that frame section to which the hopper is mounted, and a second series of conduits for delivering particulate material from the hopper to the row units mounted on the other frame section of the frame assembly, said second series of conduits including a plurality of first fixed length tubes leading from the hopper and a plurality of tubes leading from each of the row units on the other frame section of the frame assembly that are adapted to receive particulate material from the hopper, and a split manifold including a first manifold connected to the plurality of first fixed length tubes and a second manifold connected to the plurality of tubes leading from the row units mounted on the frame section of the frame assembly that receive particulate materials from the hopper, and wherein said first and second manifolds each define a series of passages therethrough such that each conduit in said second series of conduits defines an enclosed passage leading from the hopper to the row units on the other frame section of the frame assembly as long as said frame sections are disposed in a predetermined manner relative to each other and which allows the length of each conduit in said second series of conduits to be minimized without detracting from the ability of the frame sections to pivotally move horizontally relative to each other, and wherein the split manifold further includes vertically elongated mounting members associated with each manifold, and wherein at least one of said manifolds is resiliently biased outwardly away from the respective mounting member associated therewith.

* * * * *